United States Patent
Young (10) Patent No.: US 10,677,231 B2
(45) Date of Patent: Jun. 9, 2020

(54) SYSTEMS AND METHODS FOR PURGING AN EXHAUST REDUCTANT DELIVERY SYSTEM

(71) Applicant: Cummins Emission Solutions, Inc., Columbus, IN (US)

(72) Inventor: Richard D. Young, Indianapolis, IN (US)

(73) Assignee: Cummins Emission Solutions, Inc., Columbus, IN (US)

(*) Notice: Subject to any disclaimer, the term of this patent is extended or adjusted under 35 U.S.C. 154(b) by 250 days.

(21) Appl. No.: 15/555,052

(22) PCT Filed: Mar. 3, 2016

(86) PCT No.: PCT/US2016/020678
§ 371 (c)(1),
(2) Date: Aug. 31, 2017

(87) PCT Pub. No.: WO2016/144692
PCT Pub. Date: Sep. 15, 2016

(65) Prior Publication Data
US 2018/0038358 A1    Feb. 8, 2018

Related U.S. Application Data

(60) Provisional application No. 62/129,474, filed on Mar. 6, 2015.

(51) Int. Cl.
*F04B 23/02* (2006.01)
*F01N 3/20* (2006.01)
*F04B 49/08* (2006.01)

(52) U.S. Cl.
CPC .............. *F04B 23/02* (2013.01); *F01N 3/208* (2013.01); *F01N 3/2066* (2013.01); *F04B 49/08* (2013.01);

(Continued)

(58) Field of Classification Search
CPC .... F01N 3/2066; F01N 3/208; F01N 2610/02; F01N 2610/14; F04B 23/02; F04B 49/08; F04B 2205/063
See application file for complete search history.

(56) References Cited

U.S. PATENT DOCUMENTS 5,884,475 A * 3/1999 Hofmann ........... B01D 53/9431
                                                    60/274
6,122,908 A * 9/2000 Wirmark ............... F01N 3/0807
                                                    123/518

(Continued)

OTHER PUBLICATIONS

Written Opinion and International Search Report from corresponding PCT Application No. PCT/US2016/020678, dated May 20, 2016.

*Primary Examiner* — Matthew T Largi
(74) *Attorney, Agent, or Firm* — Foley & Lardner LLP (57) ABSTRACT

A hydraulic system comprises a fluid tank and a pump, including a pump reservoir, fluidly coupled to the tank via a supply line. A valve is in fluidic communication with the pump reservoir via a pressure line. A backflow line fluidly couples the pump reservoir to the fluid tank via a timer reservoir and an orifice included in the timer reservoir. The hydraulic system transitions between a normal state and a purge state. In the normal state in which the pump is on, a first portion of the fluid is communicated from the pump reservoir to the valve and a second portion of the fluid is communicated from the pump reservoir to the tank. In the purge state, the pressure line and valve are purged followed by the backflow line and the pump reservoir such that no fluid remains in the pump reservoir.

26 Claims, 8 Drawing Sheets (52) U.S. Cl.
CPC ...... *F01N 2610/02* (2013.01); *F01N 2610/14* (2013.01); *F04B 2205/063* (2013.01)

(56) References Cited

U.S. PATENT DOCUMENTS

| | | | |
|---|---|---|---|
| 7,654,080 B2 * | 2/2010 | Ripper | B01D 53/90 239/410 |
| 7,818,961 B2 * | 10/2010 | Leonard | B01D 53/9431 60/286 |
| 8,171,721 B2 * | 5/2012 | Boddy | F01N 3/36 60/274 |
| 8,561,392 B2 * | 10/2013 | Ogunleye | F01N 3/208 60/286 |
| 2008/0034733 A1 | 2/2008 | Miller et al. | |
| 2010/0212290 A1 | 8/2010 | Thiagarajan et al. | |
| 2013/0055701 A1 | 3/2013 | Yan et al. | |
| 2013/0111883 A1 * | 5/2013 | Liljestrand | F01N 3/208 60/274 |
| 2014/0352280 A1 | 12/2014 | Qi et al. | |

* cited by examiner

SYSTEMS AND METHODS FOR PURGING AN EXHAUST REDUCTANT DELIVERY SYSTEM

CROSS-REFERENCE TO RELATED APPLICATIONS

This application is a U.S. national stage application claiming the benefit of priority to International Application No. PCT/US2016/020678, filed on Mar. 3, 2016, which claims priority to and benefit of U.S. Provisional Patent Application No. 62/129,474, filed Mar. 6, 2015 and entitled "Systems and Methods for Purging an Exhaust Reductant Delivery System," the entire disclosure of which is incorporated herein by reference.

TECHNICAL FIELD

The present disclosure relates generally to hydraulic systems for use with exhaust aftertreatment systems.

BACKGROUND

Exhaust aftertreatment systems are used to receive and treat exhaust gas generated by internal combustion (IC) engines. Conventional exhaust gas aftertreatment systems include any of several different components to reduce the levels of harmful exhaust emissions present in exhaust gas. For example, certain exhaust aftertreatment systems for diesel-powered IC engines include a selective catalytic reduction (SCR) catalyst to convert NOx (NO and $NO_2$ in some fraction) into harmless nitrogen gas ($N_2$) and water vapor ($H_2O$) in the presence of ammonia ($NH_3$).

Generally, an exhaust reductant (e.g., a diesel exhaust fluid such as urea) is injected into the aftertreatment system and mixed with the exhaust gas. The exhaust reductant can provide a source of ammonia to facilitate at least partial reduction of the NOx gases included in the exhaust gas. The reduction byproducts of the exhaust gas are then fluidly or fluidically communicated to the catalyst included in the SCR aftertreatment system. The catalyst decomposes substantially all of the NOx gases into relatively harmless byproducts, which are expelled out of such conventional SCR aftertreatment systems.

Hydraulic systems are generally used to pump the liquid exhaust reductant into the SCR system. In conventional hydraulic systems, the exhaust reductant (e.g., a diesel exhaust fluid such as urea) can crystallize at the tip of a doser or nozzle configured to communicate the exhaust reductant into the SCR system. This restricts gas flow in a pressure line coupled to the nozzle, which results in substantial negative pressure and high vacuum. The high vacuum is equalized by pulling exhaust reductant from an exhaust reductant storage tank instantaneously after completion of a purge of the system.

During purge, the system is filled with warm gas from the vehicle's exhaust system. In cold weather conditions, after shutdown, the warm purge gas cools downs, leading to volume shrinkage. This creates a negative pressure drawing exhaust reductant from the storage tank into the pump after system shutdown. The exhaust reductant can freeze in the pump. The fluid's expansion when frozen can then lead to pump malfunctions and/or cracks.

SUMMARY

Embodiments described herein relate generally to hydraulic systems for use with exhaust aftertreatment systems. In particular, various embodiments relate to exhaust reductant delivery systems that include a timer reservoir and orifice configured to allow purging of a pressure line, backflow line and pump reservoir of the exhaust reductant delivery system on system shutdown. The purging is configured to ensure that no exhaust reductant remains in a pump reservoir after the system is shut down. In particular embodiments, the orifice is configured to allow bi-directional flow of the exhaust reductant.

In a first set of embodiments, a hydraulic system comprises a fluid tank containing a fluid and a pump and a pump reservoir. A supply line fluidly couples the fluid tank to the pump. A valve is in fluidic communication with the pump reservoir. A pressure line fluidly couples the pump reservoir to the valve. The hydraulic system also includes a timer reservoir including an orifice, and a backflow line which fluidly couples the pump reservoir to the fluid tank via the timer reservoir.

The hydraulic system is configured to transition between a normal state and a purge state. In the normal state, the pump is on and a first portion of the fluid is communicated from the pump reservoir to the valve via the pressure line. A second portion of the fluid is communicated from the pump reservoir to the fluid tank through the backflow line via the orifice and the timer reservoir. In the purge state, a first negative pressure develops at an outlet of the pump. The first negative pressure creates a second negative pressure in the pump reservoir, the valve and the pressure line. The second negative pressure purges the valve and the pressure line in a first time from pump shutdown. Furthermore, a third negative pressure develops in the backflow line. The third negative pressure draws the fluid from the backflow line via the timer reservoir and the orifice into the pump reservoir. The third negative pressure further draws air from the fluid tank into the pump reservoir such that the backflow line is purged in a second time from pump shutdown, which is greater than the first time. The first negative pressure continues to draw the fluid from the pump reservoir to the fluid tank and purges the pump reservoir with air for a third time after the backflow line is purged. The purging of the pump reservoir vents the valve, the pressure line and the pump reservoir to atmospheric pressure such that no fluid remains in the pump reservoir. In particular embodiments, at least one of the timer reservoir, the orifice and the backflow line are structured such that the second time is greater than the first time.

In a second set of embodiments, an apparatus for purging a hydraulic system comprises a fluid tank containing a fluid, a pump, a pump reservoir, a supply line fluidly coupling the fluid tank to the pump, a valve in fluidic communication with the pump reservoir, and a pressure line fluidly coupling the pump reservoir to the valve, comprises a timer reservoir including an orifice. A backflow line fluidly couples the pump reservoir to the fluid tank via the timer reservoir. The apparatus is configured to allow the hydraulic system to transition between a normal state and a purge state. In the normal state, the pump is on and a first portion of the fluid is communicated from the pump reservoir to the valve via the pressure line. A second portion of the fluid is communicated from the pump reservoir to the tank through the backflow line via the orifice and the timer reservoir. In the purge state, a first negative pressure develops at an outlet of the pump. The first negative pressure creates a second negative pressure in the pump reservoir, the valve and the pressure line. The second negative pressure purges the valve and the pressure line in a first time from pump shutdown. A third negative pressure develops in the backflow line. The third negative pressure draws the fluid from the backflow line via the timer reservoir and the orifice into the pump reservoir. The third negative pressure further draws air from the fluid tank into the pump reservoir such that the backflow line is purged in a second time from pump shutdown. The first negative pressure continues to draw the fluid to the fluid tank and purges the pump reservoir with air for a third time after the backflow line is purged The purging of the pump reservoir vents the valve, the pressure line and the pump reservoir to atmospheric pressure such that no fluid remains in the pump reservoir. At least one of the timer reservoir, the orifice and the backflow line are structured such that the second time is greater than the first time.

In a third set of embodiments, a method of purging a hydraulic system which comprises a fluid tank, a pump, a pump reservoir, a supply line fluidly coupling the fluid tank to the pump, a valve in fluidic communication with the pump reservoir, a pressure line fluidly coupling the pump reservoir to the valve, a backflow line, a timer reservoir and an orifice comprises activating the pump so as to operate the hydraulic system in a normal state. The pump reservoir is fluidly coupled to the fluid tank through the timer reservoir and the orifice via the backflow line. A first portion of the fluid is communicated from the pump reservoir to the valve via the pressure line. A second portion of the fluid is communicated from the pump reservoir to the tank through the backflow line via the orifice and the timer reservoir. The pump is deactivated so as to operate the hydraulic system in a purge state in which a first negative pressure develops at an outlet of the pump. The first negative pressure creates a second negative pressure in the pump reservoir, the valve and the pressure line. The second negative pressure purges the valve and the pressure line in a first time from pump shutdown. A third negative pressure develops in the backflow line. The third negative pressure draws the fluid from the backflow line via the timer reservoir and the orifice into the pump reservoir. The third negative pressure further draws air from the fluid tank into the pump reservoir such that the backflow line is purged in a second time from pump shutdown, which is greater than the first time. The first negative pressure continues to draw the fluid to the fluid tank and purge the pump reservoir with air for a third time after the backflow line is purged. The purging of the pump reservoir vents the valve, the pressure line and the pump reservoir to atmospheric pressure such that no fluid remains in the pump reservoir.

In a fourth set of embodiments, a control circuitry for controlling a hydraulic system so as to allow purging thereof, the hydraulic system comprising a fluid tank containing a fluid, a pump, a pump reservoir, a supply line fluidly coupling the fluid tank to the pump, a valve in fluidic communication with the pump reservoir, a pressure line fluidly coupling the pump reservoir to the valve, a backflow line, a timer reservoir and an orifice, comprises a controller. The controller is configured to be operatively coupled to the hydraulic system and control the operation thereof so as to allow the hydraulic system to transition between a normal state and a purge state. In the normal state, the controller activates the pump such that a first portion of the fluid is communicated from the pump reservoir to the valve via the pressure line. A second portion of the fluid is communicated from the pump reservoir to the tank through the backflow line via the orifice and the timer reservoir. In the purge state, the controller deactivates the pump such that a first negative pressure develops at an outlet of the pump. The first negative pressure creates a second negative pressure in the pump reservoir, the valve and the pressure line. The second negative pressure purges the valve and the pressure line in a first time from pump shutdown. Furthermore, a third negative pressure develops in the backflow line. The third negative pressure drawing the fluid from the backflow line via the timer reservoir and the orifice into the pump reservoir. The third negative pressure further draws air from the fluid tank into the pump reservoir such that the backflow line is purged in a second time from pump shutdown. The first negative pressure continues to draw the fluid to the fluid tank and purges the pump reservoir with the air for a third time after the backflow line is purged. The purging of the pump reservoir vents the valve, the pressure line and the pump reservoir to atmospheric pressure such that no fluid remains in the pump reservoir.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION OF VARIOUS EMBODIMENTS

Embodiments described herein relate generally to hydraulic systems and in particular, to exhaust reductant delivery systems that include a timer reservoir and orifice configured to allow purging of a pressure line, backflow line and pump reservoir of the exhaust reductant delivery system on system shutdown. The purging is configured to ensure that no exhaust reductant remains in a pump reservoir after the system is shut down. In particular embodiments, the orifice is configured to allow bi-directional flow of the exhaust reductant.

Specific embodiments described herein provide a number of benefits including, for example: (1) venting of a pressure line, a backflow line and a pump reservoir of a hydraulic system to atmospheric pressure; (2) preventing any negative pressure from remaining in the pump reservoir after the hydraulic system is shut down, thereby preventing any fluid (e.g., exhaust reductant) from being drawn into the pump reservoir after shutdown to prevent fluid crystallization and pump malfunction; (3) providing desired purging characteristics by removing check valve from a backflow connector, providing a timing reservoir and/or adjusting length of the backflow line without using complex algorithms or electronic controls; and (4) allowing transformation of conventional hydraulic systems to the hydraulic systems described herein with minimal modifications.

Figure 1:
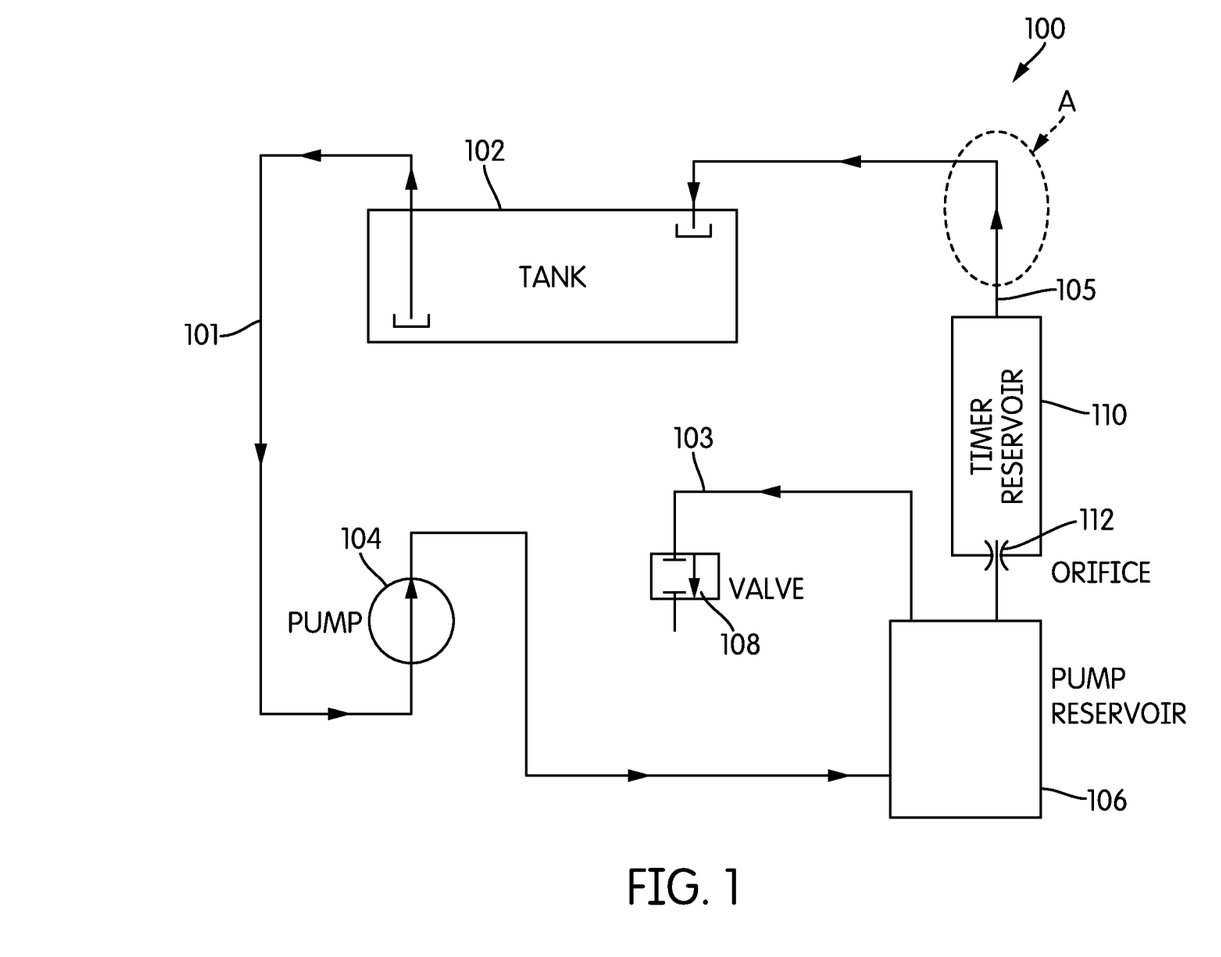
FIG. 1 is a schematic diagram of an embodiment of a hydraulic system in a normal state.
Figure 2:
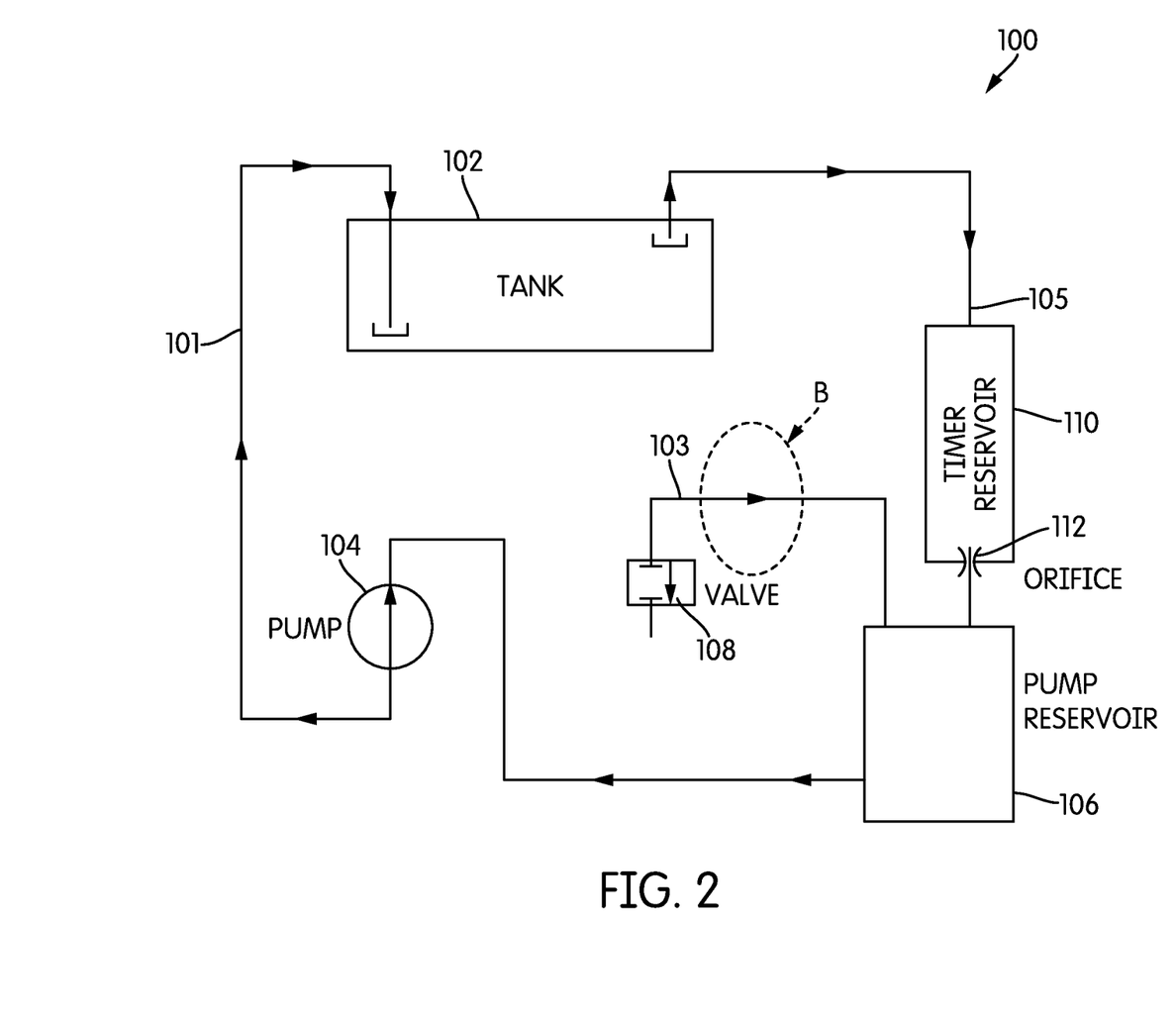
FIG. 2 is a schematic diagram of the hydraulic system of FIG. 1 in a purge state in which the pressure line is purging.
Figure 3:
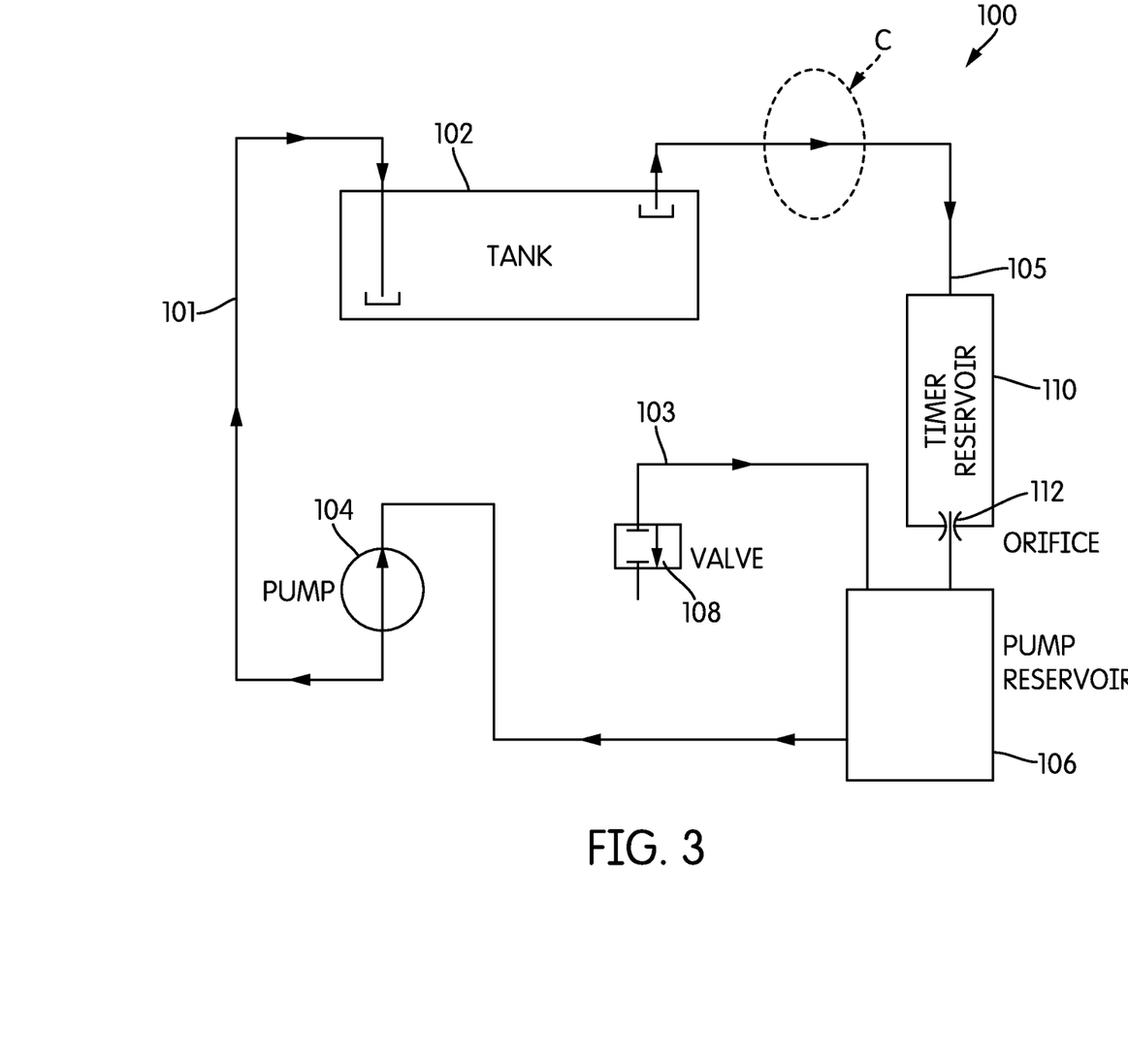
FIG. 3 is a schematic diagram of the hydraulic system of FIG. 1 in the purge state in which the backflow line is purging.

FIGS. 1-3 are schematic block diagrams of a hydraulic system 100 for communicating measured amounts of a fluid in various operational states. In particular embodiments, the hydraulic system 100 can include an exhaust reductant delivery system configure to deliver metered amounts of the exhaust reductant to an aftertreatment system (not shown). The hydraulic system 100 includes a fluid tank 102, a pump 104, a pump reservoir 106, a valve 108, and a timer reservoir 110 including an orifice 112.

The fluid tank 102 is configured to store a volume of a fluid. In particular embodiments, the hydraulic system 100 can include an exhaust reductant delivery system. In such embodiments, the fluid tank 102 stores a volume of an exhaust reductant formulated to facilitate reduction of an exhaust gas flowing through the aftertreatment system. For example, the exhaust gas can include a diesel exhaust gas and the exhaust reductant can include a diesel exhaust fluid. Such diesel exhaust fluids can include a source of ammonia, for example an aqueous solution of urea (e.g., the diesel exhaust fluid available under the trade name ADBLUE®).

The pump 104 is fluidly (also referred to as fluidically) coupled to the tank 102 via a supply line 101. The pump 104 is the prime mover configured to pump the fluid through a hydraulic circuit of the hydraulic system 100. The pump 104 includes a pump reservoir 106. The pump reservoir 106 acts as a temporary store of the fluid and allows controlled metering of the fluid to the valve 108.

The valve 108 is in fluidic communication with the pump reservoir 106 via a pressure line 103. The valve 108 includes a one way valve. In particular embodiments, the valve 108 can be included in an injector or doser configured to communicate an exhaust reductant (e.g., urea) to an aftertreatment system. In such embodiments, the injector can also include a nozzle or doser tip (not shown) configured to communicate the exhaust reductant into the aftertreatment system.

The hydraulic system 100 also includes a timer reservoir 110 that includes an orifice 112. A backflow line 105 fluidly couples the pump reservoir 106 to the fluid tank 102 via the time reservoir 110. In some embodiments, the backflow line 105 has a sufficient length (e.g., at least 1.25 meters) such that backflow line 105 serves as the timer reservoir 110. In such embodiments, a backflow connector which includes the orifice 112 can be included in the hydraulic system 100 for fluidly coupling the backflow line 105 to the pump reservoir 106. In this manner, the hydraulic system 100 forms a closed loop hydraulic circuit. Furthermore, end of the backflow line 105 coupled to the fluid tank 102 is located within the fluid tank 102 so as to be positioned above a surface of the fluid contained within the fluid tank 102.

Figure 4:
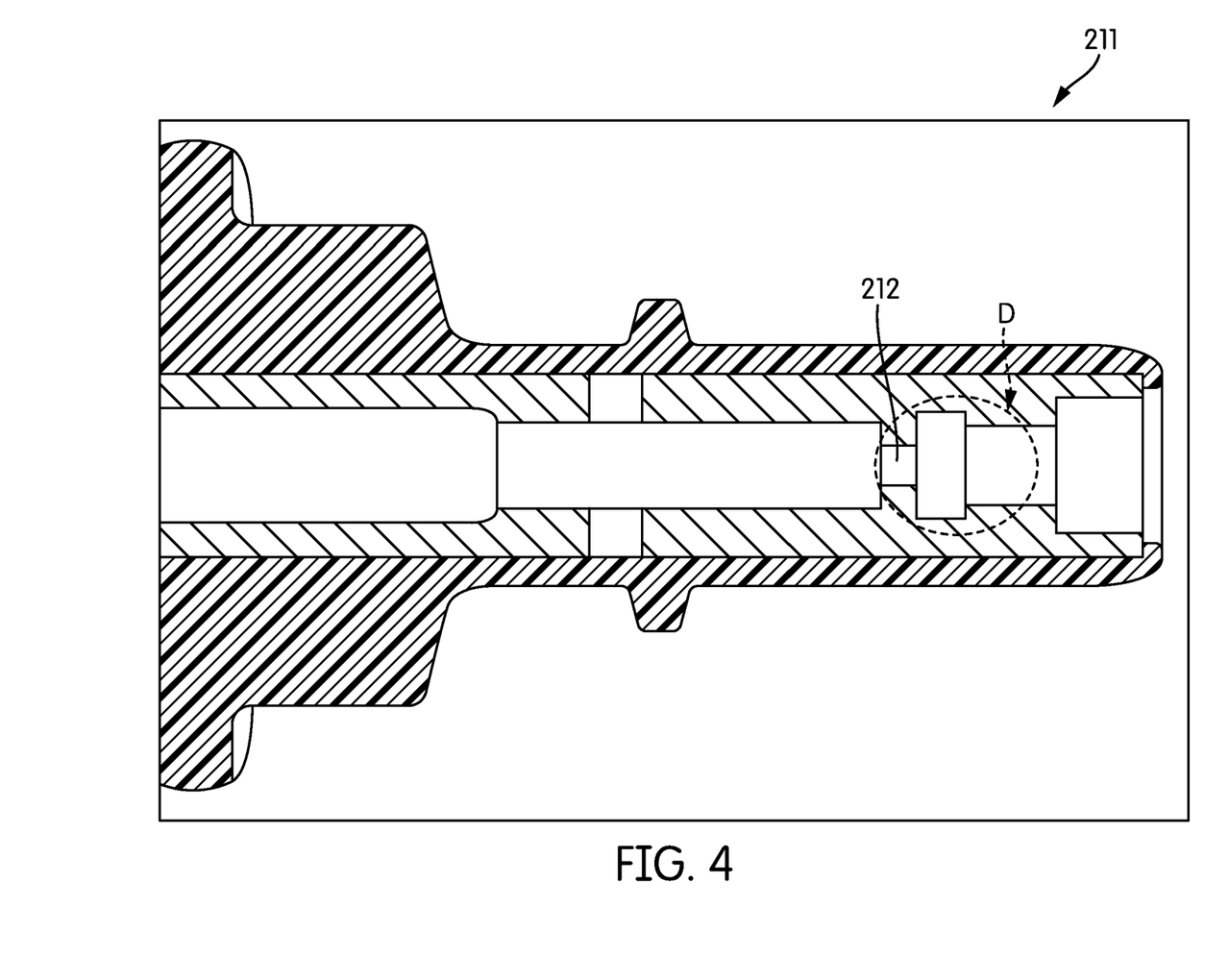
FIG. 4 is a side cross-section image of one embodiment of a backflow connector for use in the system of FIG. 1, wherein the backflow connector includes a check valve which is removed before including the backflow connector in the hydraulic system of FIG. 1.

In particular embodiments, the orifice 112 does not include a check valve such that the orifice 112 allows bi-directional flow between the pump reservoir 106 and the fluid tank 102. For example, FIG. 4 is an image of a cross-section of a backflow connector 211 which can be included in the hydraulic system 100. The backflow connector 211 includes an orifice 212 and a check valve assembly shown by the arrow D which is removed from the backflow connector 211 before integrating the backflow connector 211 into the hydraulic system 100. In this manner, the backflow connector 211, and thereby the orifice 212, can allow bi-directional flow between the pump reservoir 106 and the fluid tank 102.

The hydraulic system 100 is configured to transition between a normal state and a purge state. FIG. 1 shows the hydraulic system operating in the normal state. In the normal state the pump 104 is on and the fluid is pumped from the fluid tank 102 by the pump 104 to the pump reservoir 106. A first portion of the fluid is communicated from the pump reservoir 106 to the valve 108 via the pressure line 103. For example, the first portion of the fluid can include a metered amount of exhaust reductant to be communicated to the aftertreatment system through the pressure line 103 and the valve 108.

A second portion of the fluid is communicated to the fluid tank 102 through the backflow line 105 via the orifice 112 and the timer reservoir 110, as shown by the arrow A in FIG. 1. The second portion of the fluid is significantly smaller than the first portion of the fluid. For example, the second portion of the fluid can include excess amount of exhaust reductant remaining in the pump reservoir 106 after the first portion of the exhaust reductant has been communicated through the valve 108 to the aftertreatment system. The second portion of the fluid is communicated back to the fluid tank 102 through the backflow line 105 to prevent any excess exhaust reductant from remaining in the pump reservoir 106.

When the hydraulic system 100 transitions into the purge state, a first negative pressure develops in the pump 104, and thereby an outlet thereof. The first negative pressure creates a second negative pressure in the pump reservoir 106, the valve 108 and the pressure line 103. The second negative pressure purges the valve 108 and the pressure line 103, in a first time period. Expanding further, when the first negative pressure develops, fluid is pulled towards the fluid tank 102 from the pump 104 via the supply line 101. The first negative pressure further leads to the second negative pressure in the pump reservoir 106, the pressure line 103 and the valve 108. The second negative pressure in the pressure line 103 serves to draw the fluid into the pump reservoir 106 and purge the valve 108 and the pressure line 103, as shown by the arrow B in FIG. 2.

A third negative pressure develops in the backflow line, for example because of the second negative pressure in the pump reservoir 106. The third negative pressure draws the exhaust reductant from the backflow line 105 via the timer reservoir 110 and the orifice 112 into the pump reservoir 106. As the last of the fluid is pulled from the timer reservoir 110 and the orifice 112 into the pump reservoir 106, the third negative pressure further draws air from the fluid tank 102 into the pump reservoir 106. This purges the backflow line 105 in a second time period. The timer reservoir 110, the orifice 112 and/or the backflow line 105 are configured such that the second time period is greater than the first time period, as described herein. In other words, the pressure line 103 and the backpressure line 105 start purging at the same time, but the pressure line 103 is purged first within the first time period, while the backflow line 105 continues to be purged after the pressure line 103 is purged until the end of the second time period.

In some embodiments, the timer reservoir 110 is configured to contain a volume of the fluid to allow the backflow line 105 to be purged after the pressure line 103 is purged. In such embodiments, the timer reservoir 110 serves as a hydraulic timer to provide a delay in the purging of the backflow line 105 relative to the pressure line 103. In other embodiments, the orifice 112 can have a diameter configured to allow the backflow line 105 to be purged after the pressure line 103 is purged. The diameter of the orifice, the volume of the timer reservoir 110, and the viscosity of the fluid can allow timing the purging of the backflow line 105 such that the backflow line 105 purges after the pressure line 103 is purged. For example, the second negative pressure in the pressure line 103 and the valve 108 can change from a relatively low value to a relatively high value as the last of the fluid is pulled into the pump reservoir 106 through the orifice 112 and the less viscous air passes through the orifice 112 (as described herein in further detail with reference to FIG. 6).

Figure 5:
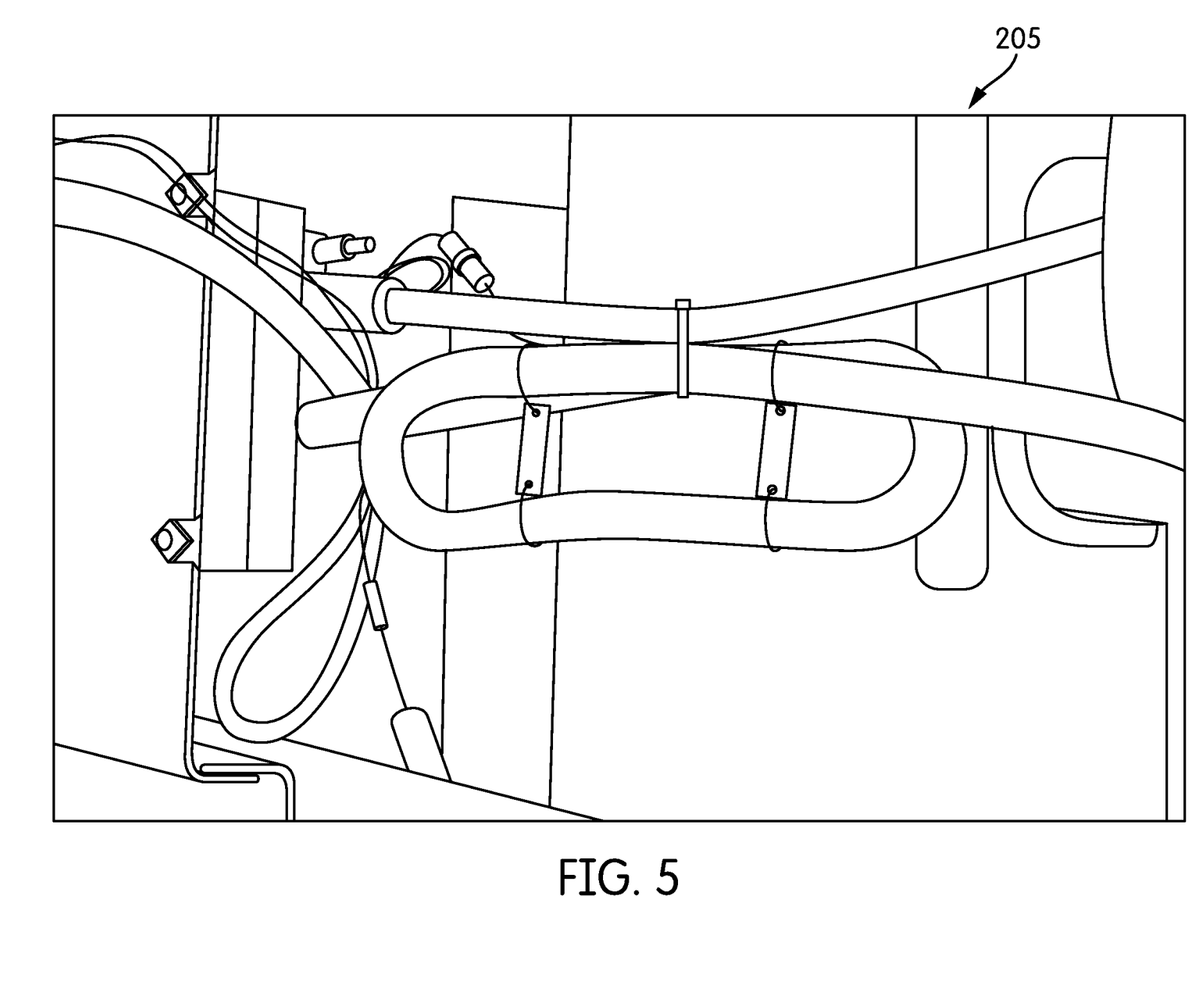
FIG. 5 is an image of another embodiment of a backflow line for use in the system of FIG. 1, wherein the backflow line is arranged in a racetrack configuration to allow a pressure line to be purged before the backflow line is purged.

In still other embodiments, the backflow line 105 can be configured to have a length to allow a sufficient volume of the fluid to be contained in the backflow line 105 such that the pressure line 103 purges before the backflow line 105. For example, the length can be such that the backflow line 105 purges after the pressure line 103 regardless of whether a nozzle or doser tip for delivering the exhaust reductant system to the aftertreatment system is clear, or blocked with exhaust reductant deposits. FIG. 5 shows an exemplary backflow line 205 which can be used in the hydraulic system 100. The backflow line 205 is arranged in a racetrack configuration such that the backflow line 205 can be compactly positioned within a hydraulic system (e.g., the hydraulic system 100). In order to ensure that the order of emptying is maintained, the volume of the timer reservoir 110 is designed to encompass pressure line emptying under restricted gas entry from the doser/nozzle. The ratio between the volume of the backflow line 105 and the pressure line 103 is inversely proportional to the diameter of the orifice 112. In a particular embodiment, this ratio is in the range of 30-35% inclusive (e.g., 33%). The volume of the backflow line 105 may be controlled by changing the line's length or diameter.

After the backflow line 105 is purged, the first pressure continues to draw the fluid from the pump reservoir 106 to the fluid tank 102 to purge the pump reservoir with the air for a third time period after the backflow line 105 is purged. The purging of the pump reservoir 106 with air from the fluid tank 102 vents the valve 108, the pressure line 103 and the pump reservoir 106 to atmospheric pressure such that the no fluid remains in the pump reservoir 106. In other words, the hydraulic system 100 is calibrated such that the pressure line 103 is purged before the backflow line 105, and after the backflow line 105 is purged there is sufficient negative pressure (e.g., the first negative pressure) in the hydraulic system 100 to continue purging the pump reservoir 106 until no fluid remains in the pump reservoir 106. The purging of the pump reservoir 106 with the air from the fluid tank 102 equalizes the pressure in the system to near ambient pressure such that no negative pressure remains in the system for drawing any fluid from the fluid tank 102 into the pump reservoir 106 after the pump 104 is shut down.

In this manner, no fluid remains in the pump reservoir 108 after the pump is shut down. Thus, there is no opportunity for the fluid to freeze in the pump reservoir 106 under cold conditions, thereby eliminating pump malfunction and failure. In certain embodiments, the pumping duration is adjusted to account for purging of the backflow line 105 before the pressure line 103.

Figure 6:
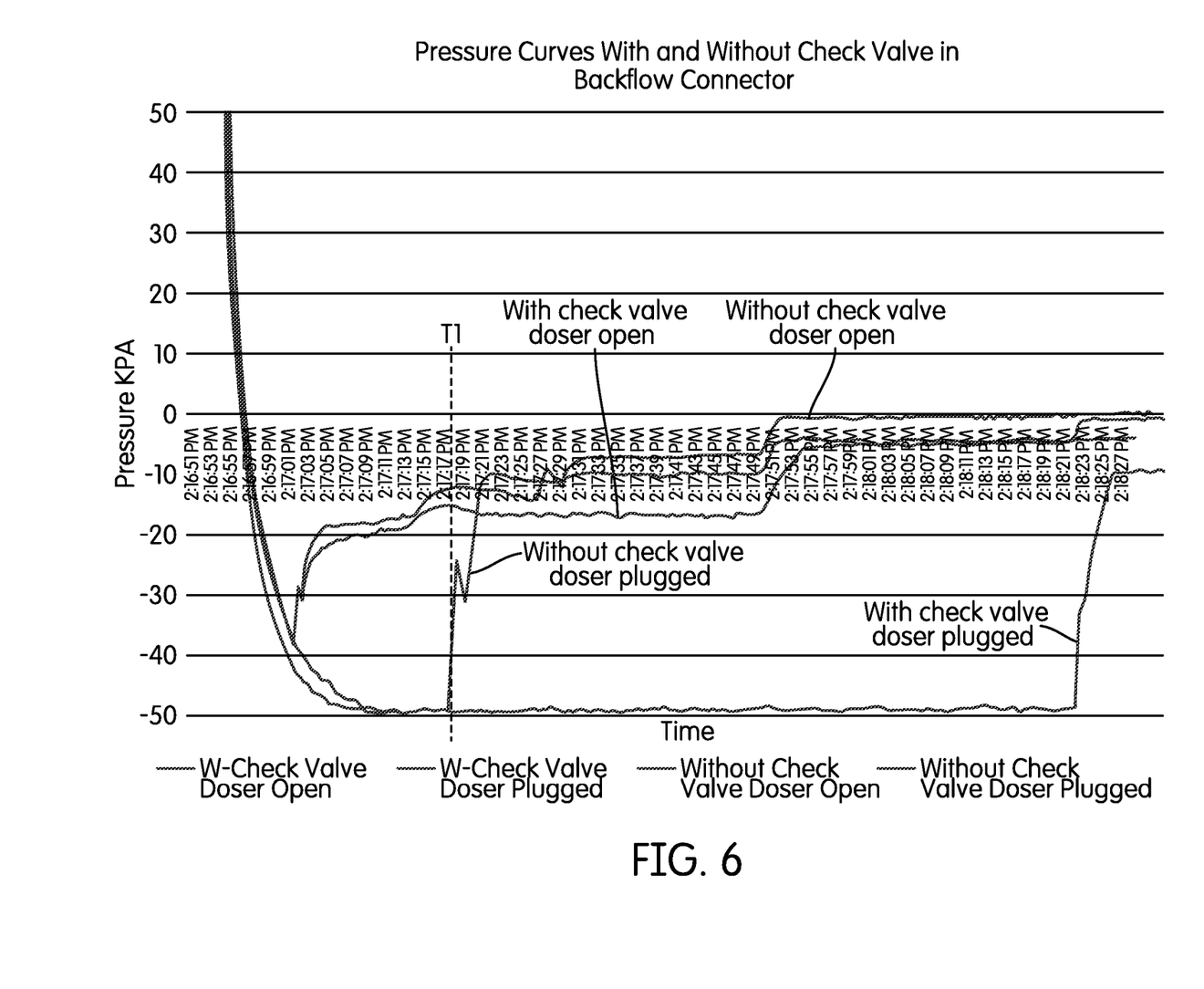
FIG. 6 is a plot of pressure curves after pump shutdown of a pressure line included in an exemplary hydraulic system substantially similar to the hydraulic system of FIG. 1, which includes the backflow connector of FIG. 4 with and without the check valve.

FIG. 6 includes plots of pressure profiles in the pressure line included in a hydraulic system on shutting down of pump included in the hydraulic system. The hydraulic system can be substantially similar to the hydraulic system of FIG. 1-3. The hydraulic system was used to pump diesel exhaust fluid. The hydraulic system includes the backflow connector of FIG. 4 having an orifice with and without a check valve. The pressure profiles of the pressure line for the hydraulic system including the backflow connector with check valve and a doser (i.e., nozzle of an injector) open, and including backflow connector without check valve and having the doser open (i.e., not plugged with diesel exhaust fluid deposits) are similar. However, the pressure in the pressure line included the hydraulic system that includes the backflow connector without the check valve equilibrates to near atmospheric pressure after an initial negative pressure much earlier than the system with the backflow connector that includes the check valve.

As seen in FIG. 6, when the check valve is present and the doser is plugged, the pressure in the pressure line falls to a substantial negative pressure of −50 kPa and remains at this pressure for a prolonged period of time even after the pump is shut down. This prolonged negative pressure leads to drawing of the exhaust reductant into the pump reservoir after the pump is shut down which is detrimental, as described herein.

In contrast, when the check valve is absent and the doser is plugged, the negative pressure is generated in the pressure line until time T1. This time is controlled by the pressure difference across the orifice, the size (e.g., diameter) of the orifice and/or the viscosity of the fluid flowing through the orifice. In this manner, the timer reservoir and the orifice can be used as a timer to allow the pressure line to be purged before the backflow line. Time T1 is sufficient to allow the pressure line to be purged and corresponds to the time at which the last of the diesel exhaust fluid is drawn into pump reservoir. At this time, the less viscous air drawn from the tank passes through the orifice which allows the negative pressure in the pressure line to rise to near ambient (from −50 kPa to −10 kPa). In other words, the time point T1 represents a change in an operating state of the hydraulic system where prior to T1, the hydraulic circuit of the system is primarily purging the pressure line, and after T1 the hydraulic circuit is primarily purging the pump assembly. After the pump shutdown, the open orifice continues to draw air and effectively vents the pump reservoir and pressure line to ambient thereby preventing any negative pressure in these components that might otherwise pull the exhaust reductant back into the pump reservoir.

Figure 7A:
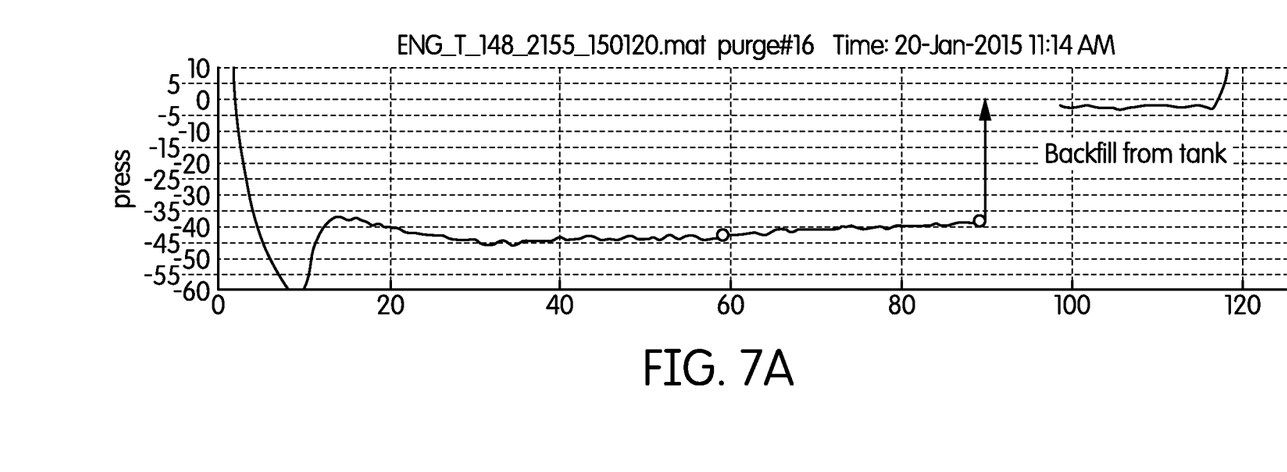
FIG. 7A is a plot of pressure profile after pump shutdown of a pressure line of a hydraulic system which includes a backflow connector having a check valve and a plugged nozzle.
Figure 7B:
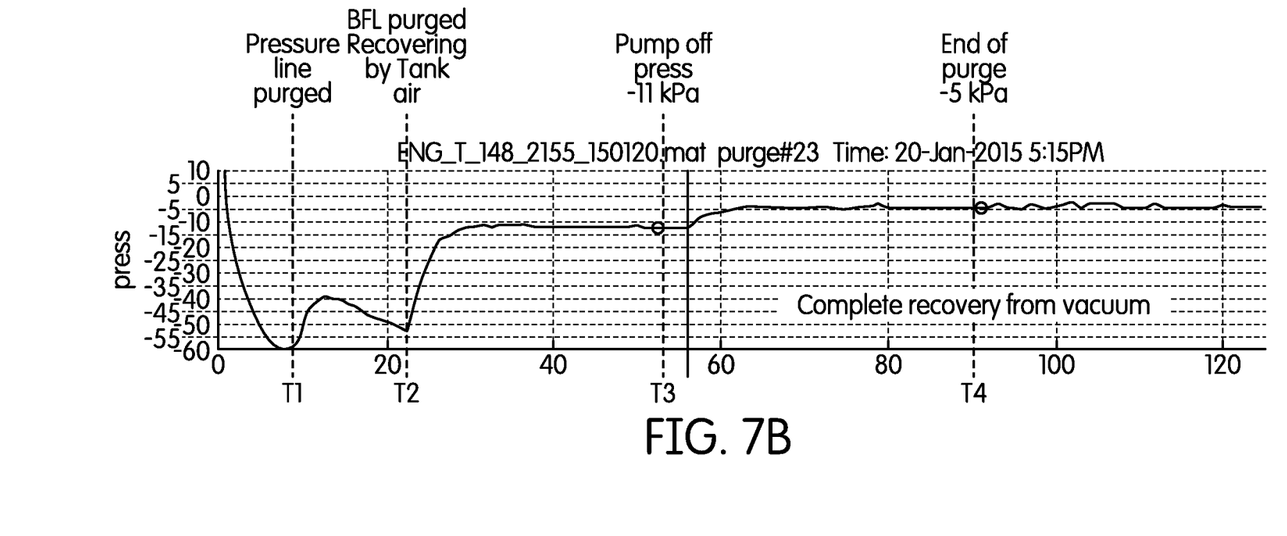
FIG. 7B is a plot of the pressure profile on pump shutdown of the pressure line of the hydraulic system of FIG. 7A but with the check valve removed from the backflow connector.

FIGS. 7A and 7B show various pressure profiles of a pressure line at various operational state of a hydraulic system that includes the timer reservoir and the orifice with and without the check valve in more detail. FIG. 7A shows the pressure profiles at various operational state of the hydraulic system that includes the orifice with the check valve and the doser plugged. Once the pump is shut down, significant negative pressure develops in the pressure line. The negative pressure (about −50 kPa) is maintained for a prolonged time which urges a backflow of the exhaust reductant from the tank to the pump reservoir after pump shutdown.

In contrast, when the check valve is removed from the orifice and the doser is plugged, negative pressure (about −50 kPa) develops in the pressure line until the pressure line is purged when the pump is shut down. The pressure line is completely purged by time T1. The backflow line continues to be purged until time T2 beyond the purging of the pressure line. The pressure drops to about (−10 kPa) by time T3 while the pump reservoir continues to be purged. By time T4, the system is completely purged and the pressure in the system rises to near atmospheric pressure.

Figure 8:
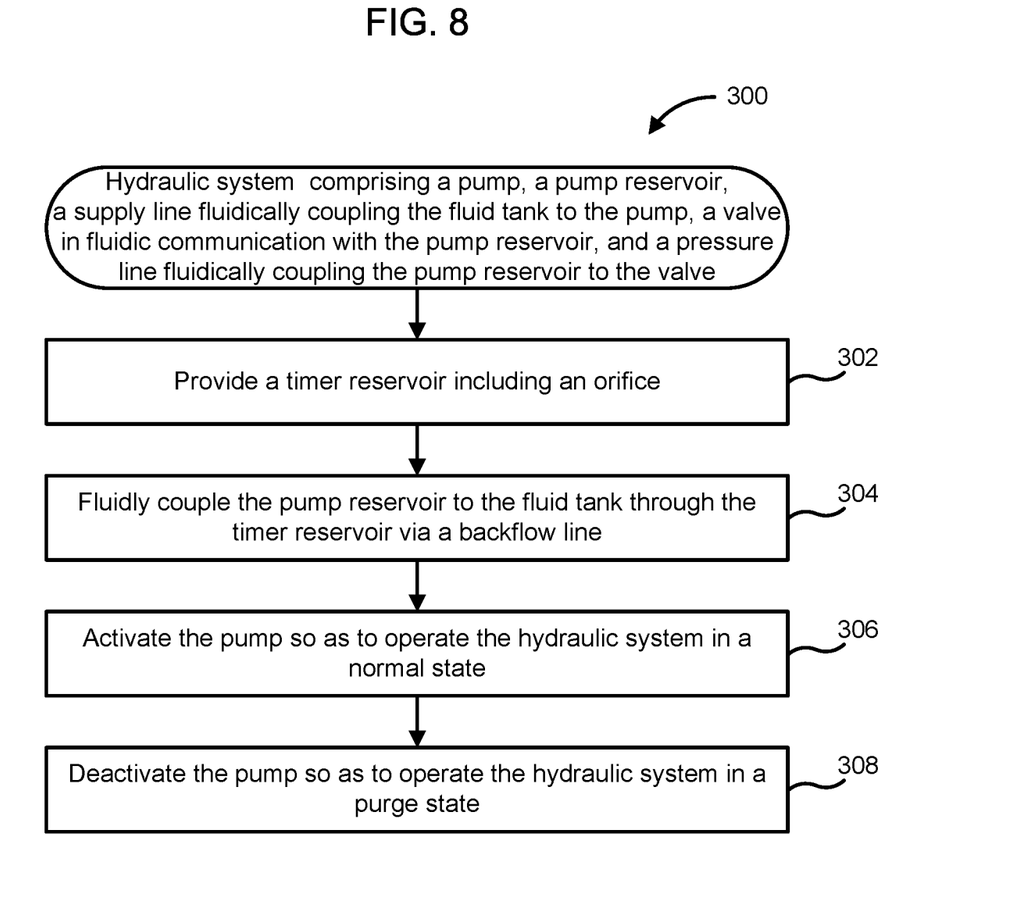
FIG. 8 is a schematic flow diagram of an example method of purging a hydraulic system.

FIG. 8 is a schematic flow diagram of an example method 300 of purging a hydraulic system (e.g., the hydraulic system 100). The hydraulic system comprises a fluid tank (e.g., the fluid tank 102), a pump (e.g., the pump 104), a pump reservoir (e.g., the pump reservoir 106), a supply line (e.g., the supply line 101) fluidly coupling the fluid tank to the pump, a valve (e.g., the valve 108) in fluidic communication with the pump reservoir, and a pressure line (e.g., the pressure line 103) fluidly coupling the pump reservoir to the valve.

The method 300 comprises providing a timer reservoir including an orifice at 302. The pump reservoir is fluidly coupled to the fluid tank through the time reservoir via a backflow line at 304. For example, the timer reservoir 110 including the orifice 112/212 is provided. The pump reservoir 106 is fluidly coupled to the fluid tank 102 through the timer reservoir 110 via the backflow line 105/205.

The pump is activated so as to operate the hydraulic system in a normal state at 306. In the normal state, a first portion of the fluid is communicated from the pump reservoir to the valve via the pressure line. Furthermore, a second portion of the fluid is communicated from the pump reservoir to the tank through the backflow line via the orifice and the timer reservoir.

The pump is deactivated so as to operate the hydraulic system in a purge state at 308. In the purge state, a first negative pressure develops in the pump and a line connecting the pump to the pump reservoir. In some embodiments, a direction of rotation of the pump may be reversed so as to create the first negative pressure or otherwise increase a magnitude of the first negative pressure. The first negative pressure creates a second negative pressure in the pump reservoir, the valve and the pressure line. The second negative pressure purges the valve and purges the pressure line in a first time from pump shutdown, as described before A third negative pressure develops in the backflow line. The third negative pressure draws the exhaust reductant from the backflow line via the timer reservoir and the orifice into the pump reservoir. The third negative pressure further draws air from the fluid tank into the pump reservoir such that backflow line is purged in a second time from pump shutdown. The first negative pressure continues to draw the fluid to the fluid tank so as to purge the pump reservoir with the air for a third time after the backflow line is purged. The purging of the pump reservoir vents the valve, the pressure line and the pump reservoir to atmospheric pressure such that no fluid remains in the pump reservoir.

The timer reservoir (e.g., the timer reservoir 110), the orifice (e.g., the orifice 112/212) and/or the backflow line (e.g., the backflow line 105/205) are structured such that the second time is greater than the first time. For example, the timer reservoir may be configured to contain a volume of the fluid to allow the backflow line to be purged in the second time.

In some embodiments, the orifice has a diameter configured to allow the backflow line to be purged in the second time. The orifice may allow bi-directional flow of the fluid. For example, the orifice may not include a check valve so that the fluid can flow back and forth between the fluid tank and the pump reservoir.

In some embodiments, the pressure line has a first length and the backflow line has a second length longer than the first length. The second length may be configured to allow the backflow line to be purged in the second time. For example, a ratio between a backflow line volume of the backflow line and a pressure line volume of the pressure line is in the range of 30% to 35% inclusive of all ranges and values therebetween. Furthermore, an end of the backflow line coupled to the fluid tank may be located within the fluid tank so as to be positioned above a surface of the fluid contained within the fluid tank.

Any of the operations included in the method 300 or any other method described herein may be performed by a control circuitry which may comprise, for example a controller. The control circuitry may be operatively coupled to the hydraulic system 100 or any other hydraulic system described herein so as to control the operation thereof, for example allow a purging thereof, as described herein. The controller may comprise a memory such as a non-transitory computer readable medium, storing instructions or algorithms corresponding to the operations of the method 300. The controller may also include a processor for interpreting and executing the instructions or algorithms stored in the memory. The controller may also include a sensor (e.g., for sensing various parameters of the hydraulic system) and/or transceiver (e.g., for communicating signals to the hydraulic system (e.g., the pump 104 of the hydraulic system 100). In various embodiments, the controller may also include one or more circuitries to control the operation of the pump or other components included in the hydraulic system.

As used herein, the singular forms "a", "an" and "the" include plural referents unless the context clearly dictates otherwise. Thus, for example, the term "a member" is intended to mean a single member or a combination of members, "a material" is intended to mean one or more materials, or a combination thereof.

As used herein, the terms "about" and "approximately" generally mean plus or minus 10% of the stated value. For example, about 0.5 would include 0.45 and 0.55, about 10 would include 9 to 11, about 1000 would include 900 to 1100.

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Other substitutions, modifications, changes and omissions may also be made in the design, operating conditions and arrangement of the various exemplary embodiments without departing from the scope of the present invention.

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A hydraulic system, comprising:
   a pump;
   a pump reservoir;
   a supply line fluidly coupling a fluid tank to the pump, the supply line structured to receive a fluid from the fluid tank;
   a valve in fluidic communication with the pump reservoir;
   a pressure line fluidly coupling the pump reservoir to the valve;
   a timer reservoir including an orifice;
   a backflow line configured to fluidly couple the pump reservoir to the fluid tank via the timer reservoir and
   a controller configured to control operation of the hydraulic system so as to allow the hydraulic system to transition between a normal state and a purge state, wherein,
   in the normal state:
      the pump is on, a first portion of the fluid from the fluid tank is communicated from the pump reservoir to the valve via the pressure line, and a second portion of the fluid is communicated from the pump reservoir to the fluid tank through the backflow line via the orifice and the timer reservoir, and wherein, in the purge state:
      a first negative pressure develops at an outlet of the pump, the first negative pressure creating a second negative pressure in the pump reservoir, the valve and the pressure line, the second negative pressure purging the valve and purging the pressure line in a first time period from pump shutdown, and
      a third negative pressure develops in the backflow line, the third negative pressure drawing the fluid from the backflow line via the timer reservoir and the orifice into the pump reservoir, the third negative pressure further drawing air from the fluid tank into the pump reservoir such that the backflow line is purged in a second time period from pump shutdown, the second time period greater than the first time period, the first negative pressure continuing to draw the fluid to the fluid tank and purge the pump reservoir with the air for a third time period after the backflow line is purged, the purging of the pump reservoir venting the valve, the pressure line and the pump reservoir to atmospheric pressure such that no fluid remains in the pump reservoir.

2. The hydraulic system of claim 1, wherein at least one of the timer reservoir, the orifice and the backflow line are structured to cause the second time period to be greater than the first time period.

3. The hydraulic system of claim 2, wherein the timer reservoir is configured to contain a volume of the fluid to allow the backflow line to be purged in the second time period.

4. The hydraulic system of claim 3, wherein the orifice has a diameter configured to allow the backflow line to be purged in the second time period.

5. The hydraulic system of claim 3, wherein the orifice does not include a check valve such that the orifice allows bi-directional flow of the fluid between the pump reservoir and the fluid tank.

6. The hydraulic system of claim 1, wherein the fluid is an exhaust reductant.

7. The hydraulic system of claim 1, wherein the fluid comprises a diesel exhaust fluid.

8. The hydraulic system of claim 2, wherein the pressure line has a first length and the backflow line has a second length longer than the first length, the second length configured to allow the backflow line to be purged in the second time period.

9. The hydraulic system of claim 8, wherein a ratio between a backflow line volume of the backflow line and a pressure line volume of the pressure line is in a range of 30% to 35% inclusive.

10. An apparatus for purging a hydraulic system comprising a fluid tank containing a fluid, a pump, a pump reservoir, a supply line fluidly coupling the fluid tank to the pump, a valve in fluidic communication with the pump reservoir, and a pressure line fluidly coupling the pump reservoir to the valve, the apparatus comprising:
  a timer reservoir including an orifice;
  a backflow line fluidly coupling the pump reservoir to the fluid tank via the timer reservoir and
  a controller configured to control operation of the apparatus so as to allow the hydraulic system to transition between a normal state and a purge state,
  wherein, in the normal state:
    the pump is on, a first portion of the fluid is communicated from the pump reservoir to the valve via the pressure line, and a second portion of the fluid is communicated from the pump reservoir to the fluid tank through the backflow line via the orifice and the timer reservoir, and
  wherein, in the purge state:
    a first negative pressure develops at an outlet of the pump, the first negative pressure creating a second negative pressure in the pump reservoir, the valve and the pressure line, the second negative pressure purging the valve and purging the pressure line in a first time period from pump shutdown, and
    a third negative pressure develops in the backflow line, the third negative pressure drawing the fluid from the backflow line via the timer reservoir and the orifice into the pump reservoir, the third negative pressure further drawing air from the fluid tank into the pump reservoir such that the backflow line is purged in a second time period from pump shutdown, the first negative pressure continuing to draw the fluid to the fluid tank and purge the pump reservoir with the air for a third time period after the backflow line is purged, the purging of the pump reservoir venting the valve, the pressure line and the pump reservoir to atmospheric pressure such that no fluid remains in the pump reservoir,
    wherein at least one of the timer reservoir, the orifice and the backflow line are structured such that the second time period is greater than the first time period.

11. The apparatus of claim 10, wherein the timer reservoir is configured to contain a volume of the fluid to allow the backflow line to be purged in the second time period.

12. The apparatus of claim 11, wherein the orifice has a diameter configured to allow the backflow line to be purged in the second time period.

13. The apparatus of claim 11, wherein the orifice does not include a check valve such that the orifice is allows bi-directional flow of the fluid between the pump reservoir and the fluid tank.

14. The apparatus of claim 10, wherein the fluid is an exhaust reductant.

15. The apparatus of claim 10, wherein the fluid comprises a diesel exhaust fluid.

16. The apparatus of claim 10, wherein the pressure line has a first length and the backflow line has a second length longer than the first length, the second length configured to allow the backflow line to be purged in the second time period.

17. The apparatus of claim 16, wherein a ratio between a backflow line volume of the backflow line and a pressure line volume of the pressure line is in a range of 30% to 35% inclusive.

18. The apparatus of claim 10, wherein an end of the backflow line coupled to the fluid tank is located within the fluid tank so as to be positioned above a surface of the fluid contained within the fluid tank.

19. A method of purging a hydraulic system comprising a fluid tank, a pump, a pump reservoir, a supply line fluidly coupling the fluid tank to the pump, a valve in fluidic communication with the pump reservoir, a pressure line fluidly coupling the pump reservoir to the valve, a backflow line, a timer reservoir and an orifice, the method comprising:
  activating the pump so as to operate the hydraulic system in a normal state, the pump reservoir fluidly coupled to the fluid tank through the timer reservoir and the orifice via the backflow line, wherein a first portion of the fluid is communicated from the pump reservoir to the valve via the pressure line, and wherein a second portion of the fluid is communicated from the pump reservoir to the fluid tank through the backflow line via the orifice and the timer reservoir; and
  deactivating the pump so as to operate the hydraulic system in a purge state, wherein a first negative pressure develops at an outlet of the pump, the first negative pressure creating a second negative pressure in the pump reservoir, the valve and the pressure line, the second negative pressure purging the valve and purging the pressure line in a first time period from pump shutdown, and a third negative pressure develops in the backflow line, the third negative pressure drawing the fluid from the backflow line via the timer reservoir and the orifice into the pump reservoir, the third negative pressure further drawing air from the fluid tank into the pump reservoir such that the backflow line is purged in a second time period from pump shutdown, the second time period greater than the first time period, the first negative pressure continuing to draw the fluid to the fluid tank and purge the pump reservoir with the air for a third time period after the backflow line is purged, the purging of the pump reservoir venting the valve, the pressure line and the pump reservoir to atmospheric pressure such that no fluid remains in the pump reservoir.

20. The method of claim 19, wherein at least one of the timer reservoir, the orifice and the backflow line are structured to cause the second time period to be greater than the first time period.

21. The method of claim 20, further comprising:
  reversing a flow of the pump so as to create the first negative pressure at the outlet of the pump.

22. The method of claim 20, wherein the timer reservoir is configured to contain a volume of the fluid so as to allow the backflow line to be purged in the second time period.

23. The method of claim 20, wherein the orifice has a diameter configured to allow the backflow line to be purged in the second time period.

24. The method of claim 23, wherein the orifice does not include a check valve such that the orifice allows bi-directional flow of the fluid between the pump reservoir and the fluid tank.

25. The method of claim 20, wherein the pressure line has a first length and the backflow line has a second length longer than the first length, the second length configured to allow the backflow line to be purged in the second time period.

26. A control circuitry for controlling a hydraulic system so as to allow purging thereof, the hydraulic system comprising a fluid tank containing a fluid, a pump, a pump reservoir, a supply line fluidly coupling the fluid tank to the pump, a valve in fluidic communication with the pump reservoir, a pressure line fluidly coupling the pump reservoir to the valve, a backflow line, a timer reservoir and an orifice, the control circuitry comprising:
- a controller configured to be operatively coupled to hydraulic system, the controller further configured to control operation of the hydraulic system so as allow the hydraulic system to transition between a normal state and a purge state,
- wherein, in the normal state:
  - the controller activates the pump such that a first portion of the fluid is communicated from the pump reservoir to the valve via the pressure line, and a second portion of the fluid is communicated from the pump reservoir to the fluid tank through the backflow line via the orifice and the timer reservoir, and
- wherein in the purge state:
  - the controller deactivates the pump such that a first negative pressure develops at an outlet of the pump, the first negative pressure creating a second negative pressure in the pump reservoir, the valve and the pressure line, the second negative pressure purging the valve and purging the pressure line in a first time period from pump shutdown, and
- a third negative pressure develops in the backflow line, the third negative pressure drawing the fluid from the backflow line via the timer reservoir and the orifice into the pump reservoir, the third negative pressure further drawing air from the fluid tank into the pump reservoir such that the backflow line is purged in a second time period from pump shutdown, the first negative pressure continuing to draw the fluid to the fluid tank and purge the pump reservoir with the air for a third time period after the backflow line is purged, the purging of the pump reservoir venting the valve, the pressure line and the pump reservoir to atmospheric pressure such that no fluid remains in the pump reservoir.

\* \* \* \* \*